(12) United States Patent
Shi et al.

(10) Patent No.: US 8,494,519 B2
(45) Date of Patent: Jul. 23, 2013

(54) METHOD FOR SOLVING CONFLICT BETWEEN NETWORK SEARCHING AND MOBILE PHONE TRAFFIC AND A MULTI-CARD MULTI-BY MOBILE PHONE

(75) Inventors: Feng Shi, Shanghai (CN); Yu Sun, Shanghai (CN)

(73) Assignee: Speadtrum Communications (Shanghai) Co., Ltd., Shanghai (CN)

( * ) Notice: Subject to any disclaimer, the term of this patent is extended or adjusted under 35 U.S.C. 154(b) by 258 days.

(21) Appl. No.: 13/102,598

(22) Filed: May 6, 2011

(65) Prior Publication Data
US 2012/0021804 A1 Jan. 26, 2012

(30) Foreign Application Priority Data
Jul. 23, 2010 (CN) .......................... 2010 1 0240586

(51) Int. Cl.
*H04W 4/00* (2009.01)
*H04M 1/00* (2006.01)
(52) U.S. Cl.
USPC ............. 455/434; 455/435.1; 455/552.1; 455/558; 455/161.1; 370/328; 370/338
(58) Field of Classification Search
USPC ........... 455/434, 161.1, 168.1, 552.1–553.1, 455/179.1, 435.1–435.3, 551, 558; 370/328, 370/329, 338
See application file for complete search history.

(56) References Cited

U.S. PATENT DOCUMENTS

| | | | |
|---|---|---|---|
| 7,359,676 B2 * | 4/2008 | Hrastar | 455/67.11 |
| 8,064,927 B2 * | 11/2011 | Hsu et al. | 455/456.2 |
| 8,145,215 B2 * | 3/2012 | Olson | 455/434 |
| 8,185,157 B2 * | 5/2012 | Shi | 455/558 |
| 8,244,301 B2 * | 8/2012 | Shi | 455/558 |
| 2003/0050070 A1 * | 3/2003 | Mashinsky et al. | 455/452 |
| 2004/0165563 A1 * | 8/2004 | Hsu et al. | 370/338 |

(Continued)

FOREIGN PATENT DOCUMENTS

| | | |
|---|---|---|
| CN | 1784025 A | 6/2006 |
| CN | 101094513 A | 12/2007 |
| CN | 101179796 A | 5/2008 |
| WO | 2004030388 A2 | 4/2004 |

*Primary Examiner* — Matthew Sams
(74) *Attorney, Agent, or Firm* — Kilpatrick Townsend & Stockton LLP

(57) ABSTRACT

A method for solving conflict between network searching and mobile phone traffic of a multi-card multi-standby mobile phone is provided. The method comprises storing network searching information of a first user card and processing the mobile phone traffic of a second user card, when conflict occurs between the network searching of the first user card and the mobile phone traffic of the second user card, and continuing to perform the network searching according to the stored network searching information of the first user card after completing the mobile phone traffic, when processing time of the mobile phone traffic of the second user card is less than or equal to a time threshold value. A multi-card multi-standby mobile phone is provided too. The mobile phone comprises a RAM for storing the network searching information, a timer unit for measuring the processing time of mobile phone traffic, a comparing unit set with the time threshold value for comparing the processing time of the mobile phone traffic with the time threshold value, and a MCU for continuing to perform the network searching according to the stored network searching information of the first user card when the processing time of the mobile phone traffic is less than or equal to the time threshold value. The present invention promotes the efficiency of the network searching.

6 Claims, 2 Drawing Sheets

U.S. PATENT DOCUMENTS

| | | |
|---|---|---|
| 2004/0203435 A1* | 10/2004 | Karlquist et al. .......... 455/67.11 |
| 2005/0144237 A1* | 6/2005 | Heredia et al. ................ 709/206 |
| 2007/0155421 A1* | 7/2007 | Alberth et al. ............. 455/553.1 |
| 2009/0156256 A1* | 6/2009 | Shi ................................ 455/558 |
| 2009/0170501 A1* | 7/2009 | Olson ........................... 455/425 |

* cited by examiner

METHOD FOR SOLVING CONFLICT BETWEEN NETWORK SEARCHING AND MOBILE PHONE TRAFFIC AND A MULTI-CARD MULTI-BY MOBILE PHONE

CROSS REFERENCE TO RELATED APPLICATIONS

The present application claims the priority of Chinese Patent Application No 201010240586.0, entitled "a method for solving conflict between network searching and mobile phone traffic and a multi-card multi-standby mobile phone", and filed Jul. 23, 2010, the entire disclosure of which is incorporated herein by reference.

FIELD OF THE INVENTION

The present invention relates to the field of mobile communication, and particularly to a method for solving conflict between network searching and mobile phone traffic, and a multi-card multi-standby mobile phone.

BACKGROUND OF THE INVENTION

Mobile phones have advantages of mobility, safety and stability, and are indispensable communication products in people's routine life and work.

Normally, the mobile phones have to perform network searching when turning on, lose network, or roaming among different Public Land Mobile Networks (PLMN) or after camping on a network for emergency calling.

A method for performing network searching when a mobile communication device loses network, is disclosed in Chinese patent application with publication No. CN1784025A. Referring to FIG. 1, a flow chart of a method for performing network searching in prior art is illustrated. In this method, the mobile communication device starts network searching when losing network, and starts a next network searching if an interval between adjacent network searching that is prescribed as an initial value of a timer has elapsed. The interval between two adjacent network searching is slightly larger than a previous interval between the two adjacent network searching. In this way, electric power is saved without adverse influence on speed of network searching.

A multi-card multi-standby mobile phone comprises at least two Subscriber Identity Module (SIM) cards for communicating with different mobile communication service providers. Network searching is needed once one SIM card in the mobile phone loses connection with the mobile communication service provider. A procedure of network searching is divided into multiple steps. Other SIM card in the mobile phone is still in the normal communication state for receiving service (a call between the mobile phone and other mobile communication devices, short message, Bluetooth and so on) requests among each step of the network searching. However, the multi-card multi-standby mobile phone includes only one antenna for sending/receiving communication information, and thus the mobile phone cannot simultaneously perform network searching and mobile phone traffic. Normally, the mobile phone traffic will firstly processed and then the network searching is performed again for avoiding the network searching to affect feeling of mobile phone users, which leads to decreased efficiency.

Therefore, it is desired for the skilled persons in the art to solve the conflict between network searching and mobile phone traffic thereby promoting efficiency of the network searching.

SUMMARY OF THE INVENTION

The present invention provides a method for solving conflict between network searching and mobile phone traffic, which promotes efficiency of the network searching.

To achieve the object, the present invention provides a method for solving conflict between network searching and mobile phone traffic of a multi-card multi-standby mobile phone. The method includes: storing network searching information of a first user card and processing the mobile phone traffic of a second user card, when conflict occurs between the network searching of the first user card and the mobile phone traffic of the second user card; and continuing to perform the network searching according to the stored network searching information of the first user card after completing the mobile phone traffic, when processing time of the mobile phone traffic of the second user card is less than or equal to a time threshold value.

The mobile phone traffic of the second user card is a short message service. The continuing to perform the network searching according to the stored network searching information of the first user card after completing the mobile phone traffic includes: continuing to perform the network searching according to the stored information of network searching of the first user card after sending short messages.

Processing time of the mobile phone traffic is measured while processing the mobile phone traffic of the second user card.

The network searching of the first user card is performed again after completing the mobile phone traffic, when the processing time of the mobile phone traffic is longer than the time threshold value.

The storing the network searching information of the first user card includes: storing the network searching information in a RAM of the mobile phone.

The network searching information includes: a searched frequency point information or a searched cell information.

The time threshold value is less than or equal to 10 s.

Correspondingly, the present invention provides a multi-card multi-standby mobile phone. The mobile phone includes: at least two types of user cards; a communication unit for transmitting communication information; a MCU for performing network searching and mobile phone traffic of the user cards, storing network searching information of a first user card in a RAM and processing mobile phone traffic of a second user card and starting a timer unit when conflict occurs between the network searching of the first user card and the mobile phone traffic of the second user card, and continuing to perform the network searching according to the stored network searching information of the first user card after completing the mobile phone traffic of the second user card when a comparing result sent by a comparing unit shows that processing time of the mobile phone traffic of the second user card is less than or equal to a time threshold value; the RAM for storing the network searching information; the timer unit for measuring the processing time for the MCU to process the mobile phone traffic, when the timer unit is started; and the comparing unit set with the time threshold value for comparing the processing time of the mobile phone traffic measured by the timer unit with the time threshold value and sending the comparing result to the MCU.

The MCU performs the network searching of the first user card again after completing the mobile phone traffic of the second user card, when the comparing result sent by the comparing unit shows that the processing time of the mobile phone traffic is longer than the time threshold value.

In comparison with conventional technologies, the present invention has the following advantages: in the method for solving conflict between the network searching and the mobile phone traffic of the present invention, according to different processing time of different mobile phone traffic, whether to use the stored network searching information is determined respectively. Wherein, for mobile phone traffic with short processing time, the network searching is continued to be performed according to the stored network searching information after completing the mobile phone traffic, which promotes the efficiency of the network searching.

Moreover, for mobile phone traffic with long processing time, the network searching is performed again after completing the mobile phone traffic, avoiding to use network searching information which is unfit for current network environment.

DETAILED DESCRIPTION OF THE EMBODIMENTS

Hereunder, the present invention will be described in detail with reference to embodiments, in conjunction with the accompanying drawings.

Embodiments to which the present invention is applied are described in detail below. However, the invention is not restricted to the embodiments described below.

A multi-card multi-standby mobile phone with single baseband chip will start to perform network searching of a first user card when in use, the first user card loses contact with a mobile communication service provider. It will take much time to perform network searching, and a procedure of network searching is divided into multiple steps. The mobile phone may receive mobile phone traffic of a second user card among the steps of network searching. Wherein, the mobile phone traffic may be a call between the mobile phone and other mobile communication devices, short message, Bluetooth and so on. Different time is spent for the mobile phone to process different mobile phone traffic. For example, processing time of the short message service is less than processing time of the Bluetooth service.

Figure 1:
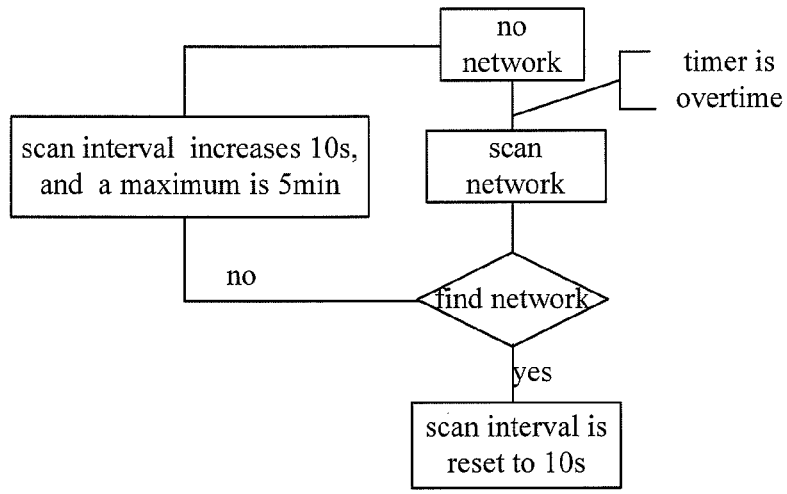
FIG. 1 is a flow chart of a method for performing network searching in prior art.
Figure 2:
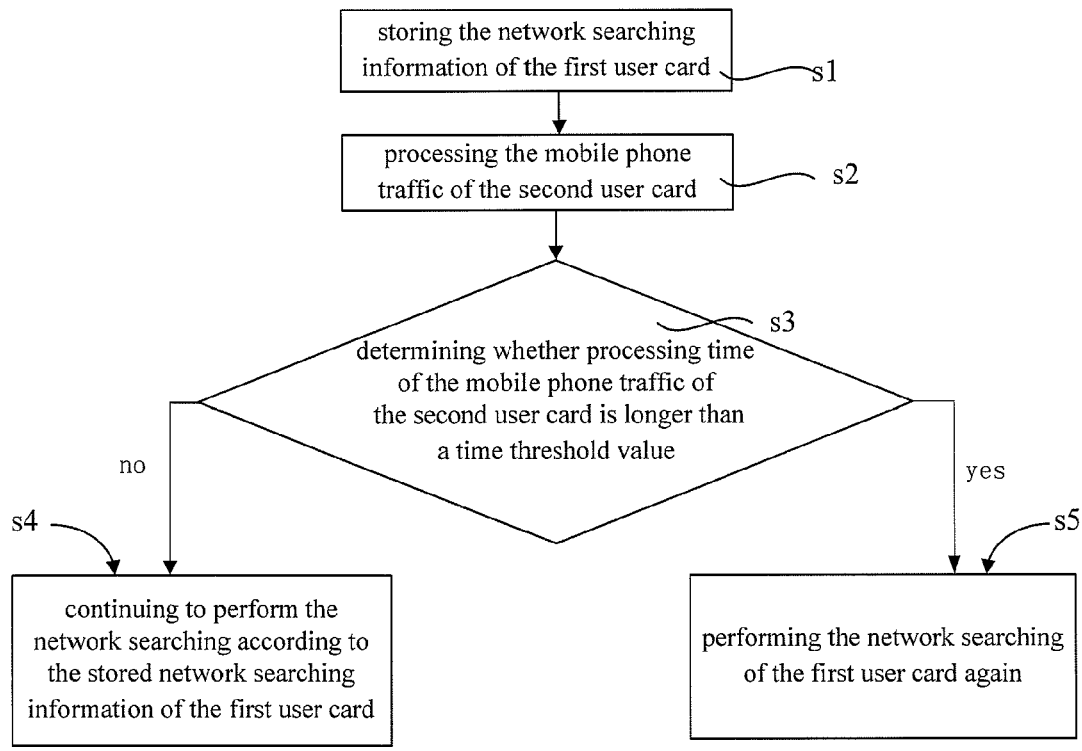
FIG. 2 is a flow chart of an embodiment of the method for solving conflict between network searching and mobile phone traffic in the present invention.

Referring to FIG. 2, a flow chart of an embodiment of the method for solving conflict between network searching and mobile phone traffic in the present invention is illustrated. When conflict occurs between the network searching of a first user card and the mobile phone traffic of a second user card, following method is used for solving the conflict between the network searching and the mobile phone traffic. The method includes:

Step s1, storing network searching information of the first user card;

Step s2, processing the mobile phone traffic of the second user card;

Step s3, determining whether processing time of the mobile phone traffic of the second user card is longer than a time threshold value;

Step s4, continuing to perform the network searching according to the stored network searching information of the first user card, after completing the mobile phone traffic, when processing time of the mobile phone traffic of the second user card is less than or equal to the time threshold value; and Step s5, performing the network searching of the first user card again, when the processing time of the mobile phone traffic is longer than the time threshold value.

Hereunder, each of steps will be described in detail.

For the step s1, the network searching information of the first user card is stored in Random Access Memory (RAM) of the mobile phone. The network searching information may include a searched frequency point information or a searched cell information. Concretely, cells and system information which have been searched and decoded. Timing and frequency of the cells whose synchronization channel (SCH) have been searched.

For the step s2, the mobile phone traffic of the second user card is processed under the control of a Micro Control Unit (MCU) of the mobile phone. Such as, under the control of the MCU, the second user card completes receiving short message service.

For the step s3, the time threshold value should be pre-set during the initial configuration of the mobile phone. It should be noted that, if the time threshold value is set too high, network environment will greatly change during a longer time, which causes the stored network searching information not to be continued to be used. Thus, the time threshold value should be less than or equal to 10 s.

Concretely, determining whether processing time of the mobile phone traffic is longer than the time threshold value in the step s3 is completed under the control of the MCU of the mobile phone.

Figure 3:
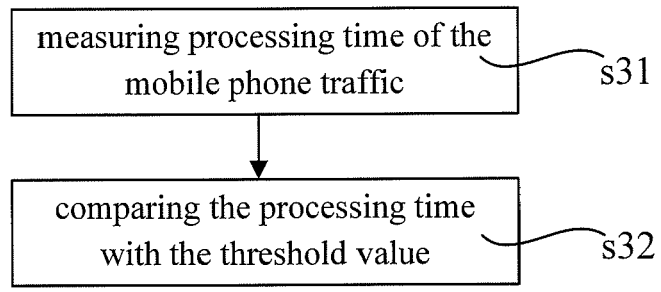
FIG. 3 is a flow chart of an embodiment of the step s3 in FIG. 2.

Referring to FIG. 3, a flow chart of an embodiment of the step s3 in FIG. 2 is illustrated. The step s3 includes:

Step s31, measuring processing time of the mobile phone traffic; and

Step s32, comparing the processing time with the time threshold value.

Wherein, for the step s31, the mobile telephone includes a timer unit for measuring the processing time of the mobile phone traffic of the first user card in the step s2.

In the step s32, the mobile phone includes a comparing unit. The time threshold value is set in the comparing unit. The comparing unit compares the processing time of the mobile phone traffic measured in the step s31 with the time threshold value for obtaining relative size between the processing time and the time threshold value.

For the step s4, if the processing time of the mobile phone traffic of the second user card is less than or equal to the time threshold value, which shows the processing time of the mobile phone traffic of the second user card is short, the communication network environment changes little in the short time, and thus the stored network searching information of the first user card can be continued to be used. Therefore, the network searching of the first user card can be continued to be performed according to the stored network searching information after completing the mobile phone traffic of the second user card, which avoids wasting the time of network searching and raises the efficiency of the network searching.

For the step s5, if the processing time of the mobile phone traffic of the second user card is longer than the time threshold value, which shows the processing time of the mobile phone traffic of the second user card is longer, the communication network environment changes greatly in the longer time, and thus the stored network searching information of the first user card can not be continued to be used. Under the condition, the network searching of the first user is performed again. Concretely, the network searching information is cleaned and the network searching of the first user is restarted from scratch after completing the mobile phone traffic of the second user card.

Figure 4:
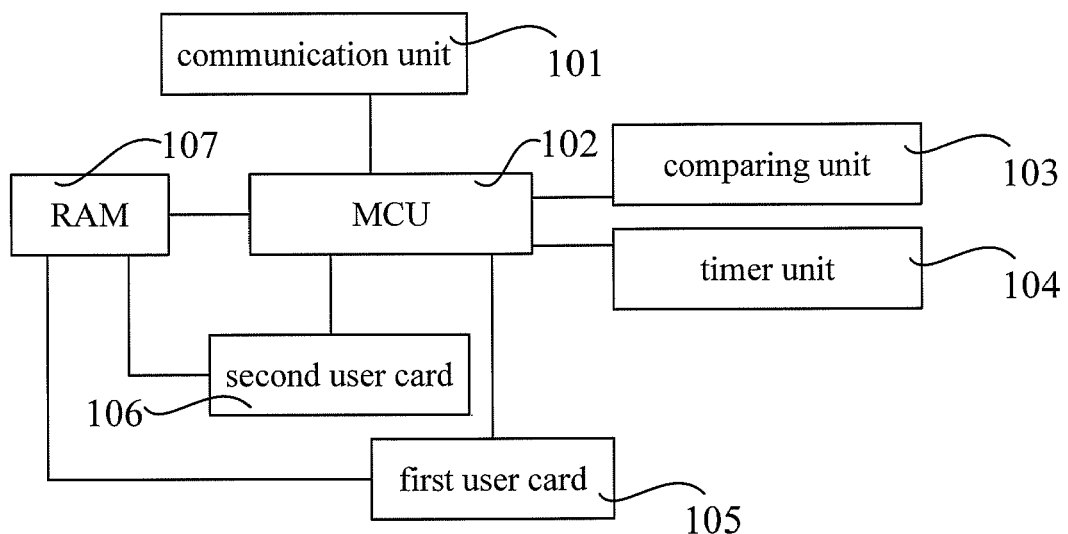
FIG. 4 is schematically shows an embodiment of the multi-card multi-standby mobile phone in the present invention.

Correspondingly, the present invention provides a multi-card multi-standby mobile phone. Referring to FIG. 4, an embodiment of the multi-card multi-standby mobile phone in the present invention is illustrated. The multi-card multi-standby mobile phone includes a communication unit 101, a MCU 102, a comparing unit 103, a timer unit 104, a first user card 105, a second user card 106 and a RAM 107.

The communication unit 101 is used for transmitting data between the mobile phone and communication networks.

A MCU 102 used for performing network searching and mobile phone traffic of user cards. When conflict occurs between the network searching of the first user card 105 and the mobile phone traffic of the second user card 106, network searching information of the first user card 105 is stored in the RAM 107, the mobile phone traffic of the second user card 106 is processed, and the timer unit 104 is started for measuring processing time of the mobile phone traffic of the second user 106. After completing the mobile phone traffic of the second user card 106, a relative size of comparing the processing time of the mobile phone traffic measured by the timer unit 104 with the time threshold value in the comparing unit 103 is received. If a comparing result sent by the comparing unit 103 shows that processing time of the mobile phone traffic of the second user card 106 is less than or equal to the time threshold value, the network searching is continued to be performed according to the stored network searching information of the first user card 105 stored in the RAM 107. If the comparing result sent by the comparing unit 103 shows that processing time of the mobile phone traffic of the second user card 106 is longer than the time threshold value, the MCU performs the network searching of the first user card again. Concretely, the MCU cleans the network searching information and restarts the network searching of the first user from scratch after completing the mobile phone traffic of the second user card.

The RAM 107 is used for storing the network searching information of the second user card.

The timer unit 104 is used for measuring the time of the MCU 102 processing the mobile phone traffic of the second user card 106 when the timer unit is started.

The comparing unit 103 set with the time threshold value is used for comparing the processing time of the mobile phone traffic measured by the timer unit 104 with the time threshold value and sending the comparing result to the MCU 102.

For example, a triple-card triple-standby mobile phone includes three types user cards which are A user card, B user card and C user card. When the mobile phone is in a standby state, the B user card performs network searching because of losing network. The A user card is in a good network status and receives a service request for a user to send a short message. Network searching information of the B user card is stored in the RAM of the mobile phone, and the short message service of the A user card is processed. When the comparing unit determines that processing time of the short message service is less than the time threshold value, the B user card continues to perform the network searching according the network searching information stored in the RAM. When the comparing unit determines that processing time of the short message service is longer than the time threshold value, the network searching information stored in the RAM is abandoned to be used and the B user card performs network searching again. Similarly, when conflict occurs between network searching of the C user card and mobile phone traffic of the A user card (or B user card), similar method may be adopted.

In above embodiments of the present invention, the first user card and the second user card (or the triple-card triple-standby mobile phone) are only used for illustrating, not for limiting the present invention. The multi-card multi-standby mobile phone may include a fourth user card, a fifth user card and so on. Those skilled in the art may make various variations and modifications according to the embodiments.

In conclusion, in the method for solving conflict between the network searching and the mobile phone traffic of the present invention, according to different processing time of different mobile phone traffic, whether to use the stored network searching information is determined respectively.

Wherein, for mobile phone traffic with short processing time, the network searching is continued to be performed according to the stored network searching information after completing the mobile phone traffic, which promotes the efficiency of the network searching.

Moreover, for mobile phone traffic with long processing time, the network is searched again after completing the mobile phone traffic, avoiding to use network searching information which is unfit for current network environment.

Although the present invention has been illustrated and described with reference to the preferred embodiments of the present invention, those skilled in the art should recognize that various variations and modifications can be made without departing from the spirit and scope of the present invention. Therefore, if these variations and modifications fall into the scope defined by the claims of the present invention and its equivalents, then the present invention intends to cover these variations and modifications.

What is claimed is:

1. A method for solving conflict between network searching and mobile phone traffic of a multi-card multi-standby mobile phone sharing a single baseband chip, comprising:
   storing current network searching step information of a first user card and processing the mobile phone traffic of a second user card, when conflict occurs between the network searching of the first user card and the mobile phone traffic of the second user card; and
   resuming the network searching steps according to the stored network searching step information of the first user card after completing the mobile phone traffic, when processing time of the mobile phone traffic of the second user card is less than or equal to a time threshold value, wherein processing time of the mobile phone traffic is measured while processing the mobile phone traffic of the second user card, and wherein the network searching of the first user card is restarted at the first network searching step after completing the mobile phone traffic, when the processing time of the mobile phone traffic is longer than the time threshold value.

2. The method according to claim 1, wherein when the mobile phone traffic of the second user card is a short message service, resuming the network searching steps according to the stored network searching step information of the first user card after completing the mobile phone traffic including: resuming the network searching steps according to the stored network searching step of the first user card after sending short messages.

3. The method according to claim 1, wherein the storing the network searching step information of the first user card includes: storing the network searching step information in a RAM of the mobile phone.

4. The method according to claim 1, wherein the network searching step information includes: a searched frequency point information or a searched cell information.

5. The method according to claim 1, wherein the time threshold value is less than or equal to 10 s.

6. A multi-card multi-standby mobile phone sharing a single baseband chip, comprising:
- at least two types of user cards;
- a communication unit for transmitting communication information;
- a MCU for performing network searching and mobile phone traffic of the user cards, storing current network searching step information of a first user card in a RAM and processing mobile phone traffic of a second user card and starting a timer unit when conflict occurs between the network searching of the first user card and the mobile phone traffic of the second user card, and resuming the network searching steps according to the stored network searching step information of the first user card after completing the mobile phone traffic of the second user card when a comparing result sent by a comparing unit shows that processing time of the mobile phone traffic of the second user card is less than or equal to a time threshold value;
- the RAM for storing the network searching information;
- the timer unit for measuring the processing time for the MCU to process the mobile phone traffic, when the timer unit is started; and
- the comparing unit set with the time threshold value for comparing the processing time of the mobile phone traffic measured by the timer unit with the time threshold value and sending the comparing result to the MCU, wherein processing time of the mobile phone traffic is measured while processing the mobile phone traffic of the second user card, and wherein the network searching of the first user card is restarted at the first network searching step after completing the mobile phone traffic, when the processing time of the mobile phone traffic is longer than the time threshold value.

* * * * *

UNITED STATES PATENT AND TRADEMARK OFFICE
CERTIFICATE OF CORRECTION

PATENT NO. : 8,494,519 B2
APPLICATION NO. : 13/102598
DATED : July 23, 2013
INVENTOR(S) : Feng Shi et al.

Page 1 of 1

It is certified that error appears in the above-identified patent and that said Letters Patent is hereby corrected as shown below:

On the title page,

Item (73) delete the Assignee name "Speadtrum" and insert --Spreadtrum--

Signed and Sealed this
Twelfth Day of November, 2013

Teresa Stanek Rea
*Deputy Director of the United States Patent and Trademark Office*